US006980120B2

(12) United States Patent
Yu et al.

(10) Patent No.: US 6,980,120 B2
(45) Date of Patent: Dec. 27, 2005

(54) UNIVERSAL REMOTE CONTROL WITH DIGITAL RECORDER

(76) Inventors: Philip K. Yu, 2372 Remora Dr., Rowland Heights, CA (US) 91748; Calvin C. Fang, 17870 Calle San Lucas, Rowland Heights, CA (US) 91748

( * ) Notice: Subject to any disclaimer, the term of this patent is extended or adjusted under 35 U.S.C. 154(b) by 568 days.

(21) Appl. No.: 09/803,272

(22) Filed: Mar. 9, 2001

(65) Prior Publication Data

US 2001/0035829 A1 Nov. 1, 2001

Related U.S. Application Data

(60) Provisional application No. 60/188,972, filed on Mar. 10, 2000.

(51) Int. Cl.[7] ......................... G08L 19/00; H04M 1/00; H04M 3/00; H04B 1/38

(52) U.S. Cl. .............. 340/825.69; 455/563; 455/561.1; 455/418; 455/556.1

(58) Field of Search ................... 340/825.69; 455/563, 455/561.1, 418, 556.1, 556.2; 434/319

(56) References Cited

U.S. PATENT DOCUMENTS

| | | | | | |
|---|---|---|---|---|---|
| 4,117,542 | A | * | 9/1978 | Klausner et al. | 708/109 |
| 4,284,847 | A | * | 8/1981 | Besserman | 179/1 |
| 5,138,649 | A | * | 8/1992 | Krisbergh et al. | 455/420 |
| 5,201,067 | A | * | 4/1993 | Grube et al. | 455/556.1 |
| 5,214,422 | A | * | 5/1993 | Cullimore | 340/825.72 |
| 5,267,323 | A | * | 11/1993 | Kimura | 381/110 |
| 5,387,108 | A | * | 2/1995 | Crowell | 434/319 |
| 5,410,326 | A | * | 4/1995 | Goldstein | 348/734 |
| 5,648,760 | A | * | 7/1997 | Kumar | 340/825.25 |
| 5,671,267 | A | * | 9/1997 | August et al. | 455/420 |
| 5,812,870 | A | * | 9/1998 | Kikinis et al. | 712/32 |
| 5,867,793 | A | | 2/1999 | Davis | |
| 5,898,398 | A | | 4/1999 | Kumai | |
| 6,021,325 | A | | 2/2000 | Hall | |
| 6,145,046 | A | * | 11/2000 | Jones | 710/301 |
| 6,163,508 | A | | 12/2000 | Kim | |
| 6,256,354 | B1 | * | 7/2001 | Yoshida et al. | 375/244 |

FOREIGN PATENT DOCUMENTS

GB 2244454 * 4/1991

(Continued)

OTHER PUBLICATIONS

Printout of Web Page "About Us", Universal Remote Control, Inc., at http://www.universalremote.com/htm/about/main.htm, May 24, 2001. (1 page).

(Continued)

*Primary Examiner*—Michael Horabik
*Assistant Examiner*—Scott Au
(74) *Attorney, Agent, or Firm*—East IP Group; Philip K. Yu

(57) ABSTRACT

An improved universal remote control unit (URC) for home entertainment units. The URC has the typical remote controller module for controlling appliances such as TV, stereo, VCR or DVD. Additionally, the URC has a built-in digital recorder module for recording the consumer's voice, or any audio messages from the appliances. The digital recorder module can be implemented with a microphone, a voice recorder chip and a speaker, all integrated with the URC unit. The digital recorder module can even use the battery that is typically used by the URC. The URC alternatively can be implemented with a memory and display screen, coupled to the number keys. Such arrangement allows the telephone information to be punched in, using the numeric keys on the URC, stored in the memory for display.

7 Claims, 3 Drawing Sheets

FOREIGN PATENT DOCUMENTS

GB 2351875 * 10/2001

OTHER PUBLICATIONS

Printout of Web Page "Products", at http://www.universal-remote.com/htm/products/main.htm, May 24, 2001. (2 pages).

Printout of Web Page "MX-1000" at http://www.universalremote.com/htm/products/mx-1000.htm, May 24, 2001, (3 pages).

Printout of Web Page "MX-500" at http://www.universalremote.com/htm/products.mx-500.htm, May 24, 2001, (3 pages).

Printout of Web Page "Remote Control Codes", Radio Shack Corporation, at http://www.rcinfo.com, May 24, 2001. (1 pg).

Printout of Web Page "Category" at Radio Shack's Product Catalog, May 24, 2001. (2 pages).

Printout of Web Page "PHILIPS RCS-Product-Remote Control" Off-The-Shelf, at http://www.remotecontrol.philips.com/products,remote, May 24, 2001. (2 pages).

Printout of Web Page "PHILIPS RCS-Product-Remote Control" Tailor-Made Remote Controls, at http://www.remotecontrol.philips.com/products/remote, May 24, 2001. (1 page).

Printout of Web Page "PHILIPS RCS-Product-Remote Control" Tailor-Made, Model RC 1600, at http://www.remotecontrol.philips.com/products/remote, May 24, 2001. (1 page).

Printout of Web Page "PHILIPS RCS-Product-Remote Control" Tailor-Made, Model RC8640, at http://www.remotecontrol.philips.com/products/remote, May 24, 2001. (1 page).

Printout of Web Page PHILIPS RCS-Technology News-Speech Recognition, at http://www.remotecontrol.philips.com/, May 24, 2001. (1 page).

* cited by examiner

UNIVERSAL REMOTE CONTROL WITH DIGITAL RECORDER

CROSS REFERENCE TO RELATED APPLICATION

The present application claims priority from provisional application, Application No. 60/188,972, entitled "UNIVERSAL REMOTE CONTROL WITH DIGITAL RECORDER AN HANDS-FREE UNITS FOR IN-CAR USE OF MOBILE PHONES WITH DIGITAL RECORDER," filed on Mar. 10, 2000.

RELATED FIELD

The present invention relates to common remote control units for consumer electronics appliances and for hands-free units for mobile phones, and more particularly relates to universal remote control units for television and entertainment units.

ART BACKGROUND

As technology becomes more powerful and sophisticated, the designers for consumer electronics units, such as televisions or stereo sets, have become more and more obsessed with how to make the appliance units more sophisticated. While features such as picture-in-picture, on-screen menu and web access are developed, the designers have overlooked the most basic feature of convenience helpful to the consumers.

The first example lies in the universal remote control (URC) for home TV or stereo units. Nowadays, the URC is becoming more sophisticated and more powerful for the consumers, by allowing the consumers to control not just TV, but also a host of other home units, such as stereo, VCR, DVD, or Cable Box. All the consumer needs is just one URC in hand, after programming the URC for different entertainment units, and the consumer will be able to use the same URC to control all different units.

There is, however, one basic need that has been completely overlooked by the designers of such URCs. It is quite often that while watching or listening to a TV or stereo program, a particular piece of information may attract the attention of the consumer. How does the consumer get out of her comfort, i.e. the couch, to write down such information that is flashing by on the television? Typically, the consumer will try to find a pen and paper to write down the information, if such items are nearby. Alternatively, the consumer may begin repeating the information incessantly, e.g. the "800" telephone number needed to order a kitchen tool, while rushing to find a pen to write it down. Particularly for older people or people with physical limitations, neither is a good option. As such, with all the power and sophistication developed for the URCs, it cannot help the consumers in this simple situation of needs.

Almost all entertainment appliances now come with its own URC, which has become a inseparable part of our viewing and listening activity. In fact, the URC is sometimes blamed for the creation of "couch potatoes," in reference to those who rely heavily on the URC. There is an extremely good chance that while viewing TV, a TV viewer will be closer to the URC than to a cordless telephone, or to a pen. It is also possible that a TV viewer is sitting or lying down in a comfortable and relaxed position, instead of sitting upright or at the desk. There is nothing special about the assertion, since TV viewing is supposed to engage the attention of the viewer and the viewer needs the URC to control, or to change channels. A viewer is expected to change channels, control the volume or programming of the TV or stereo using the URC, while watching the TV or listening to the stereo. A viewer is not, however, expected to use the phone, unless someone calls, or take notes when he or she is watching TV. The comparison between the URC and the telephone is not to play down the importance of the telephone, but to illustrate what is more natural for people during TV viewing or stereo listening. It is safe to say that during TV viewing, people are much closer to a URC than to a phone or a pen and paper. Even when people move around in their viewing position, they tend to hang on to the URC, instead of the phone.

The URC is also becoming more sophisticated in that a remote control can be programmed to target not only the TV set, but also the VCR, DVD, set-top box or even stereo. In a recent article in the September 1999 issue of *Smart Money,* vendors are touting URCs, which can embody enough technology such that a typical URC costs over $150.

For example, as mentioned in the article, a top-ranked "Deluxe" URC is made by Sony (Model: RM-AV2000) with a price tag of $179.99. A midrange model is Sony RM-V 801 at $49.99. Of course, there is also the "No Frills" kind, such as the one made by RCA (SystemLink4) at $19.99. In all of the reported models, as well as the models commonly available at the market place, the much touted features among the various kind of URCs are how many different piece of entertainment units they can control, or how easy the interface is. Indeed, while the URC can control just about everything possible with respect to a viewer's home appliances, it does not help a viewer when it comes to helping him take down the simple information that was just briefly shown on TV, or played on the radio. There is a long-felt need by the consumers, whether they are young, old, healthy or physically challenged, that have been entirely ignored by the URC and TV/appliance manufacturers and designers.

Therefore, it will be desirable to have a way to help the TV viewer, or stereo listener, take down information accurately and conveniently without having to get out of their position of comfort.

It is also desirable to be able to take down information from the TV, stereo or radio using an apparatus most conveniently located within the viewer's reach.

Another example of over-developed technology failing to address simple needs lies in the wireless phones, e.g. the cellular phone, for those who tend to call while driving. Talking on the phone while driving has been linked to several automobile accidents due to driver's distraction. What is more dangerous is when the driver needs to write down information, such as the other party's telephone number or the direction to the next meeting, while driving. One of the driver's hands is already occupied by the phone set, while the other hand is occupied by the steering wheel. There is no hand left to write down any information without some dangerous maneuvering. Some phone manufacturers have already come up with "scratch pad" feature on the phone so that the consumer can punch the number to record it. U.S. Pat. No. 6,021,325, issued to David Hall on Feb. 1, 2000, entitled "MOBILE TELEPHONE HAVING CONTINUOUS RECORDING CAPABILITY," illustrates such device. Another U.S. Pat. No. 5,867,793 issued to Eddie Davis on Feb. 2, 1999, entitled "BUILT-IN, CELLULAR TELEPHONE MESSAGE RECORDER," also illustrates such feature. Having the recorder built-in on the mobile phone is still too dangerous, since operating the phone or the recorder requires the hands, even though activation may require voice or hand command. Both the Hall and Davis patent disclosures are incorporated herein as background information by reference.

Here comes the latest for talking on the phone while driving: a hands-free unit for the phone. The hands-free unit is essentially a speaker adapter that can either be built into the car's stereo system or be implemented with the cigarette lighter adapter. The hands-free unit makes driving a little safer, since the driver no longer needs to use the hands to hold on to the phone while talking. However, what happens when the driver needs to remember certain information given out by the other party? The built-in mobile phone as illustrated by the Hall or Davis patents would not seem to work, since the phone is not used. The driver needs to use the hand somehow, even though the talking part is now hands-free. Despite the sophistication in the wireless phone and accessory technology, the basic need has been overlooked, again. And this time, it becomes a safety issue.

SUMMARY OF THE INVENTION

An improved universal remote control unit (URC) for home entertainment units is disclosed. The URC has the typical remote controller module for controlling appliances such as TV, stereo, VCR or DVD. Additionally, the URC has a built-in digital recorder module for recording the consumer's voice, or any audio messages from the appliances. The digital recorder module can be implemented with a microphone, a voice recorder chip and a speaker, all integrated with the URC unit. The digital recorder module can even use the battery that is typically used by the URC. The URC alternatively can be implemented with a memory and display screen, coupled to the number keys. Such arrangement allows the telephone information to be punched in, using the numeric keys on the URC, stored in the memory for display.

The digital recorder module can also be implemented with a hands-free mobile phone unit, which connects a speakerphone to a mobile phone for in-car use. This digital recorder module uses the speaker from the speakerphone and draws power from the cigarette lighter.

DETAILED DESCRIPTION OF THE PREFERRED EMBODIMENT

The present invention is directed to an improved URC with a built-in digital voice recorder to allow the consumer to quickly record any desired information for playback. Digital recorders such as these have been recently made much more affordable, thanks to solid-state memory. The recorders do not need any tapes, nor any move parts. They typically come as a chip set, ready to be implemented in any application.

The improved URC of the present invention has a module for controlling ordinary multiple appliance sets, while incorporating a digital recorder which allows recording voices from either the consumer, or from the TV, stereo, wherever the message is delivered from. With this feature, the improved URC of the present invention eliminates the need of a viewer to rush to a pen and paper, while the commercial is flashing by. Also, it eliminates the need for the viewer to try to memorize the information by verbal repetition, while looking for a pen and paper. For senior citizens or people with physical limitations, this improved URC can help them significantly. This improved URC also helps those average "couch potatoes" who always claim to have just found a perfect sitting position.

Figure 1:
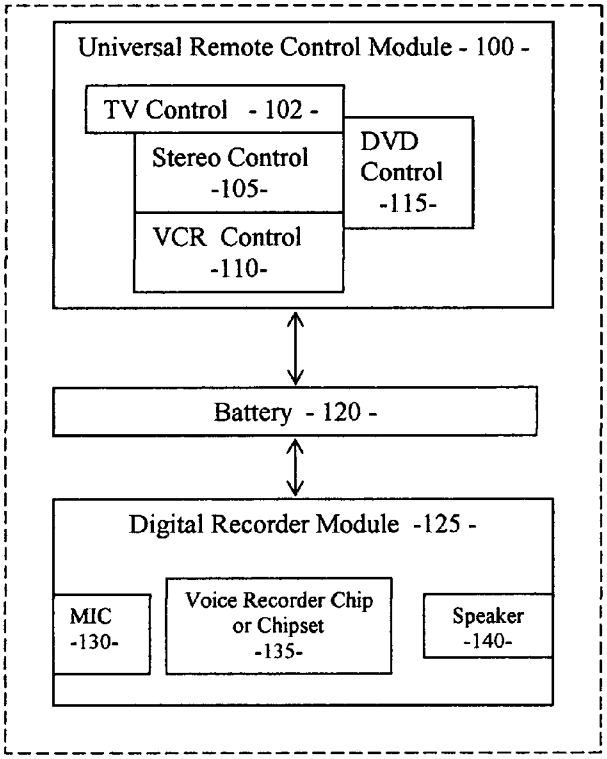
FIG. 1 is a simplified diagram of the improved URC unit with the digital recorder module of the present invention.

FIG. 1 shows a simplified diagram of the improved URC with the digital recorder module 125 in accordance with the present invention. As shown in FIG. 1, the digital recorder module 125 shares the battery 120 with the URC module 100. It should apparent to those skilled in the art that the digital recorder module 125 may have its own power source, without reliance on the battery for the URC module 100. The embodiment, as shown in FIG. 1, is intended to have a built-in digital recorder module with the URC module 100. However, as will be disclosed in the present application, an add-on digital recorder module is also available for retrofitting an existing URC. In such applications, it may be preferable for the add-on digital recorder to have its own power source, so that the additional piece will not interfere with the existing URC. Further, there is advantage of not having to deal with the electrical connection between the existing URC and the add-on digital recorder.

As shown in FIG. 1, the URC module 100 has TV control 102 to control the TV, stereo control 105 to control the stereo, VCR control 110 to control the VCR and DVD control 115 to control the DVD unit. Of course, control units for set top box, cable box or other appliances can also be added by those skilled in the art. It should be appreciated by those skilled in the art that these units are functional units, wherein the implementation for various control units is done by programming a microprocessor (not shown) to operate based on the user input. For example, the user presses a "TV" button on the remote control to instruct the microprocessor to interpret any subsequent keystrokes as they apply to the TV functions, e.g. changing the channels or controlling the volume. Pressing the "Cable" button on the remote instructs the microprocessor to interpret any subsequent keystrokes as they apply to the cable box, e.g. changing the channel or activating the pay-per-view. The design, functionality and manufacturing aspects of the URC module, by itself, have been well-known to those skilled in the art.

Figure 2:
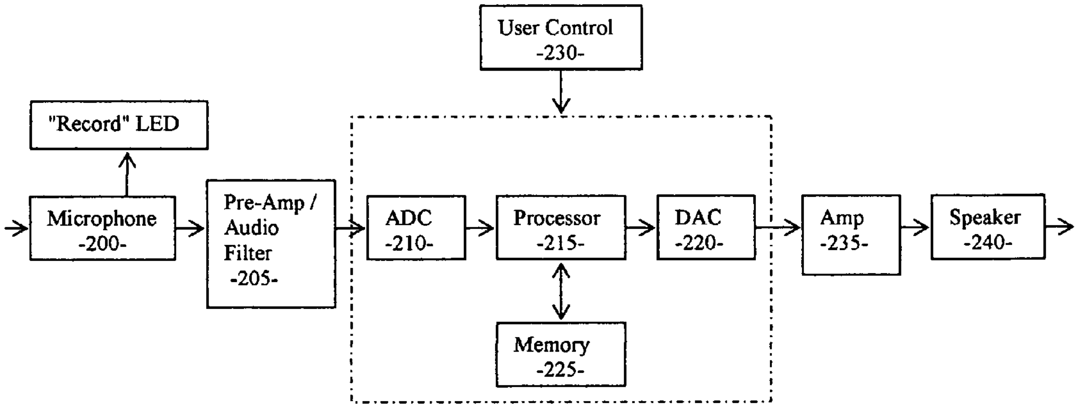
FIG. 2 illustrates a simplified block diagram of the voice recorder.

FIG. 2 shows a simplified block diagram of the digital voice recorder module 125. The voice recorder, which is to be incorporated by the URC as shown in FIG. 1, can record at least a few seconds of information from the consumer, from the TV or from wherever the source is. It has a microphone 200 for receiving voice signals, a preamplifier and filter 205, an analog-to-digital converter 210 for converting the analog signals into digital, a digital processor 215 for processing the signals and a memory 225 to record the signals. The memory preferably is a non-volatile memory for power conservation purposes. An "RECORD" LED can be used to indicate that the recorder is indeed recording.

For playback, the signals stored in the memory 225 is converted from digital to analog and amplified by a digital amplifier 235, before it is played out through its speaker 240. It should be apparent to those skilled in the art that the digital voice recorder, by itself, is available either in chipset form from companies such as Information Storage Devices ("ISD"), Inc., of San Jose, Calif., or in finished product form, although as a recorder-only unit. Radio Shack® has carried such digital recorder units as part of a key chain, for a price of around $15 retail. Despite its existence, the full power of the digital recorder has not been appreciated from the eyes of the designers of the TV and stereo units. As such, any advancement in URC technology notwithstanding, the basic need of a consumer during TV viewing has been overlooked.

Products offered by ISD, No. ISD2500 and ISD5008, use an EEPROM storage method to allow analog data to be written directly into a single cell without ADC or DAC conversion. Further, as mentioned above, such The Product Briefs for ISD2500 and ISD5008, and Product Introduction for ISD2560/75/90/120 are hereby incorporated by reference. Despite the availability of these components in recent times, they have not contributed to the universal remote control.

Why should the digital voice recorder be implemented with the URC? As mentioned before, it is highly probable that while watching TV or listening to stereo, the consumer will have his or her URC very close by or within easy reach, perhaps even more so than pens and paper. All the URCs available in the market place are competing based on their ease of programming and universality, making it more likely that the URCs will stay very close to the consumers. Nothing has addressed the seemingly tangential need of the consumers, while watching TV or listening to stereos to easily record short and transient information.

The voice recorder can use its own power, or rely on the power source from the URC. Its power consumption can be kept very low, since it consumes power only while recording or playing back. The rest of the time it does not consume power at all. It can use a "RECORD" button, with or without an LED, for recording and a "RECORD" button for play back. This represents the simple solution. While others can certainly come up with more features to make a fancier unit, the basic idea is to have the digital recorder with the URC such that the URC's proximity to the consumer is fully exploited. When the consumer sees or hears any message or information from the TV or stereo that she wants to remember, she can point the URC at the source and press the record button to record the message from the TV directly.

Alternatively, the consumer can just repeat the information and speak into the microphone 200 of the URC directly. Typically, a 20-second duration for the memory should be sufficient, but if memory becomes cheaper, more capacity can be built in. The information is maintained by the memory 200 until the next record session, which will overwrite the recording. The recorder preferably uses non-volatile memory so that the recorded information can be kept for long term purpose even after power is disconnected. The recorder will preferably continue to fill up its memory and loop back to the beginning when full, so that the last 20 seconds of information will always be kept. Of course, how the memory is implemented, e.g. duration, "first-in first-out," or loop back, can be customized by those skilled in the art based on their particular applications.

What may also improve an existing URC is to make digital recorder kits available for retrofitting the URCs for those consumers who already bought a somewhat fancy URC. This kit is essentially a digital voice recorder with playback functionality, but it comes with a strap or fastening device, e.g. Velcro, strap or clip, to allow the kit to be attached to the URC. In light of the recorders available today as a stand-alone unit, this kit can be easily built to work with the URC, although the kit may need to come with its own power supply, e.g. a battery.

Figure 5:
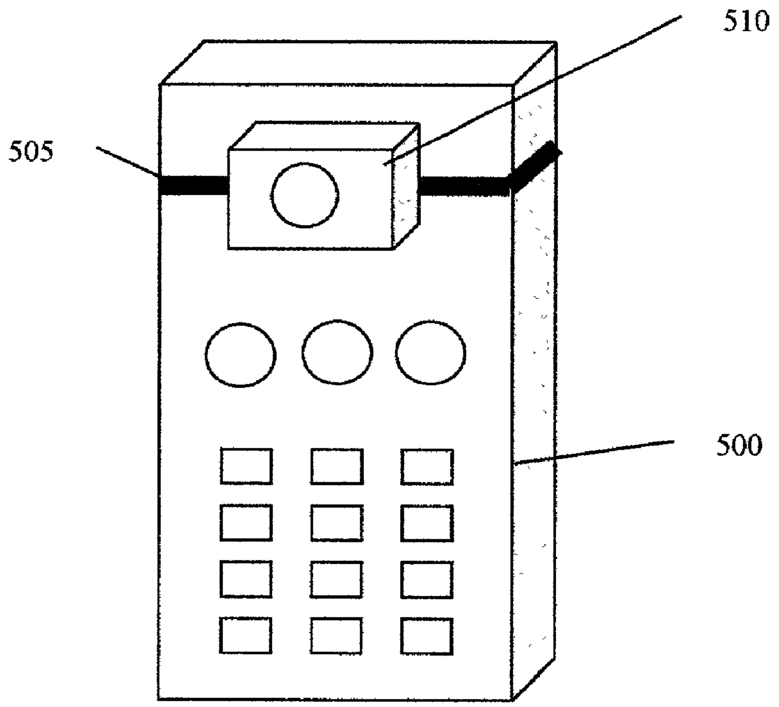
FIG. 5 shows a retrofit embodiment of the URC with the digital recorder fastened to the URC.

FIG. 5 shows a retrofit embodiment of the URC 500 with a digital voice recorder 510. The recorder 510 is fastened to the URC 500 with an elastic band. Other ways to fasten the recorder to the housing of the URC can be through Velcro enclosure, clamps, or even male-female type connectors pre-formed with the URC and recorder. For example, the URC manufacture may manufacture the URC with a pre-formed receptacle for attachment by the digital recorder with the appropriate connector. Those skilled in the art can readily design their own coupling means to firmly affix a retrofit recorder to the URC.

Instead of using a digital voice recorder on the URC to record important phone number, the URC can implement a "scratch pad" memory to store numbers entered by the numeric keys on the URC, wherein the numeric keys are standard part of the URC. When the user presses a series of numeric keys on the URC to represent a phone number, the number is stored in the memory of the URC. Upon user command, i.e. pressing a "NOTE" button, the URC stores that number for display on the LCD of the URC. Such display may stay on until overwritten by the next number. This scratch pad feature is advantageous over the voice recorder if the user is speech impaired or hearing impaired. Either limitation makes accurate recording using the voice recorder difficult, if not impossible.

Figure 3:
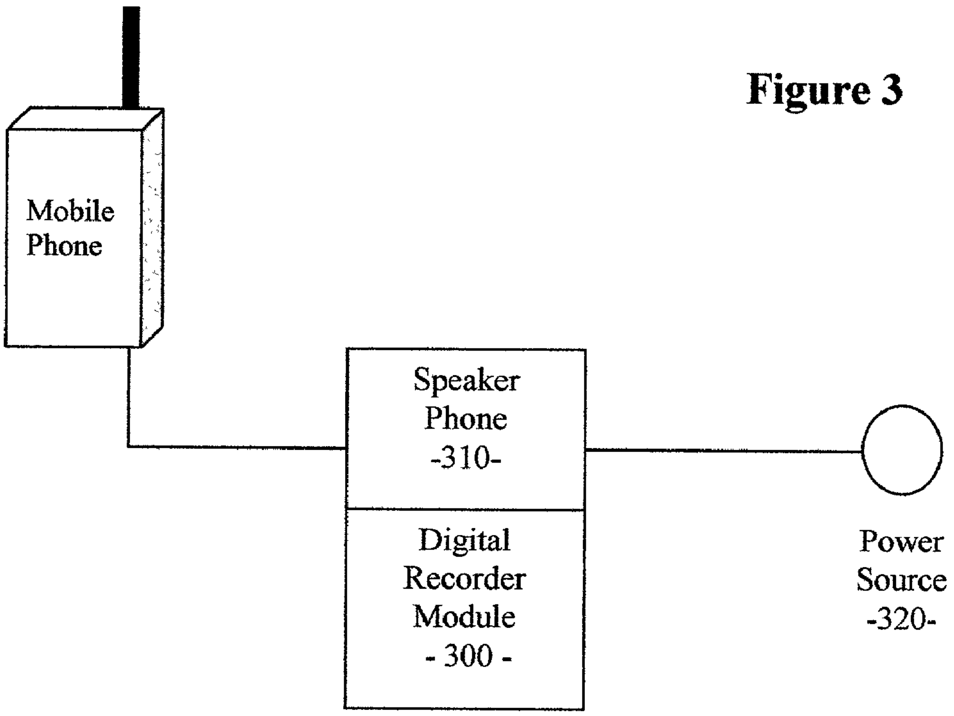
FIG. 3 illustrates a simplified diagram of the improved hands-free speaker phone unit with the digital recorder module of the present invention.
Figure 4:
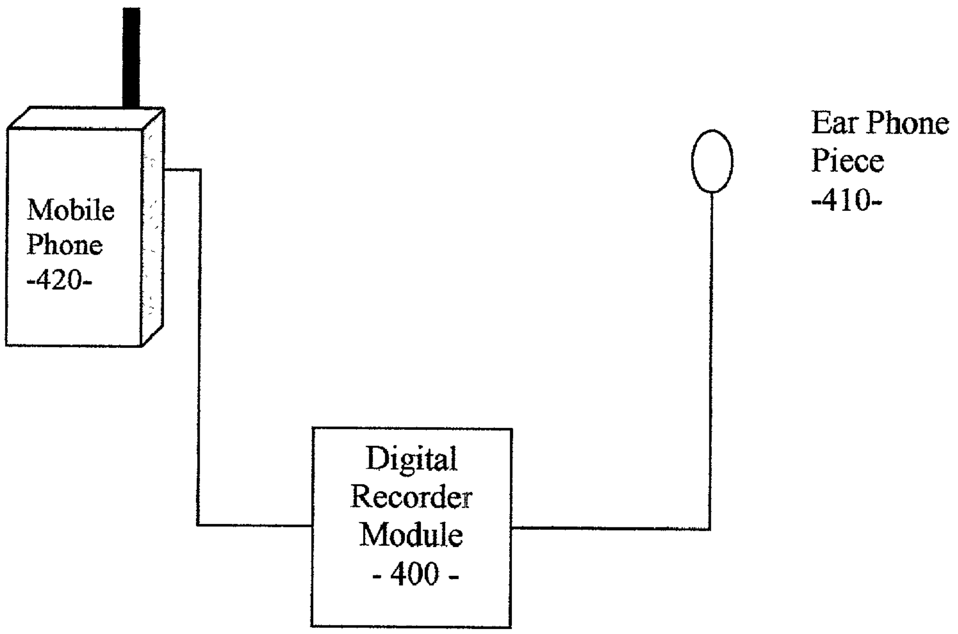
FIG. 4 illustrates a simplified diagram of the improved hands-free ear phone unit with the digital recorder module of the present invention.

With the URC with voice recorder disclosed above, the same principle can be applied to the in-car hands-free unit for a mobile phone. The hands-free unit can be either a speakerphone connecting the mobile phone to the cigarette lighter as shown in FIG. 3, or an earphone connecting only to the mobile phone as shown in FIG. 4. Both kinds of hands-free units are becoming popular nowadays, due to their safety factors. Now, either hands-free unit can incorporate the digital recorder disclosed above in an automobile to allow the driver to record information by pressing the "RECORD" button. The memory, as discussed earlier, is also preferably implemented with non-volatile memory to conserve power, as well as to preserve storage even when power is off.

For example, the driver may want to remember certain telephone number, or direction, from the party she is conversing with. Or the driver may want to remember certain information from the car radio. All the driver needs to do is to press the "RECORD" button to record either her own voice, or the voice from the source. Afterwards, the driver can play back or record more until the memory is used up.

In FIG. 3, the digital recorder module 300 is built-in with the speaker phone unit 310 of the hands-free unit. In this case, the digital recorder module can use the speaker of the speaker phone 310 for playback and the power from the cigarette lighter for power. The design of the digital voice recorder is similar to what is disclosed above in connection with FIG. 2. The design and manufacturing of such built-in recorder module is well within the knowledge of those skilled in the art.

In FIG. 4, the digital recorder module 400 is implemented as part of the ear phone unit 410 for the mobile phone unit 420. The recorder module 400 can record using its microphone and play back using its own speaker, or using the ear phone 410, depending on the desired complexity of the unit.

With the improved hands-free unit, the driver avoids having to use, or try to find, a pen and paper to write down the information while driving. The recorder-enhanced handsfree unit will make it easier and safer for drivers to use the cell phone while driving.

The recorder function may also be customized so that it will not record the voice from the party at the other end of the phone call through the speaker phone, for the sake of privacy. For example, when the "RECORD" button is pressed, the speaker unit 310 on the hands-free unit is disabled to allow only the driver's own voice, or the announcement from the radio, to be recorded.

With additional voice-activated control, the recording can be made much easier and all the driver needs to do is to say certain key words, e.g. "Recorder, record! " to activate the recorder. This is truly a hands-free environment. With the speaker built in the adapter, all the recorder needs is the microphone, A/D converter, digital filter, digital memory, amplifier, D/A converter, while utilizing the same speaker as the hands-free unit for output.

The present invention may be embodied in other specific forms without departing from the spirit or essential characteristics thereof The present embodiments are to be considered in all respects as illustrative, and not restrictive. The scope of the invention is therefore, indicated by the appended claims rather than by the foregoing description, and all changes which come within the meaning and range of equivalency of the claims are to be embraced within their scope.

We claim:

1. A universal remote control ("URC") to control at least one electronic appliance, comprising:

a housing;

a first control circuitry which, responsive to a user's command, remotely controls the operation of the at least one electronic appliance, the first control circuitry being located within the housing;

a digital voice recorder, disposed within the housing, which records audio signal from both a user and the user's ambience, and plays back said audio signal, responsive to a user's command, said digital voice recorder and said first control circuitry being operationally independent of each other;

a power supply located within said housing, said power supply being adapted to provide power to said first control circuitry and said digital voice recorder.

2. The URC according to claim 1, wherein the digital voice recorder comprises:

a microphone to receive the audio signal from both the user and the user's ambience;

a processor to process the received audio signal from said microphone;

a memory to store the processed received audio signal, said memory and said first control circuitry being operationally independent of each other;

a speaker to play back the audio signal, and a second control circuitry to operate the digital voice recorder upon the user's command.

3. The URC according to claim 1, wherein the digital voice recorder comprises:

a microphone to receive the audio signal concurrently generated by both the user and the user's ambience, said microphone being operationally independent of said control circuitry's controlling of said appliance;

a memory to store the received audio signal directly from said microphone;

a speaker to play back the received audio signal stored in the EEPROM, and control circuitry to operate the digital voice recorder upon the user's command, wherein said control circuitry is operationally independent of said microphone, memory and speaker.

4. The URC according to claim 2, wherein said control circuitry controls said appliance independent of said memory's operation.

5. The URC according to claim 2, wherein the processed received audio signal stored in said memory does not control the operation of said first control circuitry.

6. A universal remote control ("URC") to control at least one electronic appliance, comprising:

a housing;

a first control circuitry which, responsive to a user's command, remotely controls the operation of the at least one electronic appliance, the first control circuitry being located within the housing;

a digital voice recorder which records and plays back at least one audio signal, responsive to a user's command, said digital voice recorder and said first control circuitry being operationally independent of each other;

couple means to attach the digital voice recorder to the housing, wherein the couple means comprises an elastic band wrapping around the housing.

7. A universal remote control ("URC") to control at least one electronic appliance, comprising:

a housing;

a first control circuitry which, responsive to a user's command, remotely controls the operation of the at least one electronic appliance, the first control circuitry being located within the housing;

a digital voice recorder which records and plays back at least one audio signal, responsive to a user's command, said digital voice recorder and said first control circuitry being operationally independent of each other;

couple means to attach the digital voice recorder to the housing, wherein the couple means comprises at least one pair of clamps to attach the digital voice recorder to the housing.

* * * * *